United States Patent [19]

Yamano et al.

[11] Patent Number: 5,760,555
[45] Date of Patent: Jun. 2, 1998

[54] MOTOR DRIVE UNIT USED FOR CAMERA AND ACCESSORY THEREOF

[75] Inventors: Shozo Yamano, Tokyo; Nobuhiko Terui, Ichikawa, both of Japan

[73] Assignee: Nikon Corporation, Tokyo, Japan

[21] Appl. No.: 628,193

[22] Filed: Apr. 5, 1996

Related U.S. Application Data

[63] Continuation of Ser. No. 51,241, Apr. 23, 1993, abandoned.

[30] Foreign Application Priority Data

Jun. 12, 1992 [JP] Japan .................. 4-040393 U

[51] Int. Cl.$^6$ ......................................... H02P 1/22
[52] U.S. Cl. .................... 318/293; 318/379; 388/907.2; 396/133
[58] Field of Search ................. 318/280–293, 318/376–300, 362–382; 388/800–841, 907.2; 396/89–152

[56] References Cited

U.S. PATENT DOCUMENTS

| | | | |
|---|---|---|---|
| 4,680,513 | 7/1987 | Kennedy | 318/285 |
| 4,705,997 | 11/1987 | Juzswik | 318/293 X |
| 4,710,686 | 12/1987 | Guzik | 318/293 |
| 4,816,726 | 3/1989 | Novis et al. | 318/293 |
| 4,879,641 | 11/1989 | Rossi et al. | 318/293 X |
| 4,902,444 | 2/1990 | Daggett et al. | 318/568.11 |
| 4,924,158 | 5/1990 | Kelley et al. | 318/293 X |
| 5,032,774 | 7/1991 | Juzswik | 318/293 |
| 5,119,006 | 6/1992 | Schultz | 318/293 X |

*Primary Examiner*—David S. Martin

[57] ABSTRACT

A motor drive unit is provided with a bridge circuit including series connected first and second MOS transistors, series connected third and fourth MOS transistors, a DC motor connected between a junction of the first and second MOS transistors and a junction of the third and fourth MOS transistors, a power supply line connected to the first and third MOS transistors and a ground line connected to the second and fourth MOS transistors. The state of the DC motor is controlled by on/off controlling the MOS transistors of the bridge circuit. The MOS transistors are controlled such that the motor is continuously short-circuited when a power is supplied to the motor drive unit and the motor is not driven.

10 Claims, 3 Drawing Sheets

|  | D1 | D2 |
|---|---|---|
| FORWARD DRIVE | H | L |
| BACKWARD DRIVE | L | H |
| STOP | H | H |

|  | D1 | D2 |
|---|---|---|
| FORWARD DRIVE | H | L |
| BACKWARD DRIVE | L | H |
| BRAKE | H | H |
| STOP | L | L |

MOTOR DRIVE UNIT USED FOR CAMERA AND ACCESSORY THEREOF

This application is a continuation of application Ser. No. 08/051,241, filed Apr. 23, 1993, now abandoned.

BACKGROUND OF THE INVENTION

1. Field of the Invention

The present invention relates to a motor drive unit used for a camera and an accessory thereof.

2. Related Background Art

FIG. 2A shows a motor drive unit of a bridge type which comprises a DC motor M, transistors 1~10, a power supply 11, a drive control circuit 12 and other electronic components.

Such motor drive unit is used for an auto-focusing device of a camera or an irradiation angle control device of an electronic flash device which is removably mounted on the camera.

FIG. 2B shows states of signals D1 and D2 of the drive control circuit 12 of FIG. 2A. The motor M is controlled in accordance with FIG. 2B. When the motor M is to be rotated forward or backward, an H-level signal and an L-level signal which are different from each other are supplied as the signals D1 and D2. When the motor M is to be stopped, the H-level signals are supplied as the signals D1 and D2 to short the motor to brake the motor (short-brake state), and the supply is stopped when the motor completely stops. When the supply is stopped, the signals D1 and D2 are of L-level.

In such drive unit, when the drive is terminated, the brake is applied for a predetermined time, and after the motor M has completely stopped, all transistors 1~10 connected to the motor M are turned off.

However, in the motor drive unit which is used for the auto-focusing control device of the camera, if the supply is stopped after the in-focus drive control of a photographing lens and all transistors 1~10 are turned off, a load of the motor M connected to the photographing lens is very light, and the photographing lens may move if a focusing ring of a lens barrel is inadvertently touched.

SUMMARY OF THE INVENTION

In the light of the above, it is an object of the present invention to provide a circuit which continuously keeps the short-brake state even in a non-drive mode to prevent the lens (driven part) from easily moving by the touch of the focusing ring of the lens barrel so that the driven part is not inadvertently driven, and which attains energy saving in keeping the short-brake state.

In the present invention, a bridge of the motor is constructed by MOS transistors, which are controlled to continuously keep the short-brake state during the non-drive mode of the motor.

By continuously keeping the short-brake state during the non-drive mode of the motor, some force acts on the driven part so that it does not readily move. Since the drive transistors are MOS transistors, a power consumption is very small even if the short-brake state is kept.

DETAILED DESCRIPTION OF THE PREFERRED EMBODIMENT

Figures 1A, 1B:
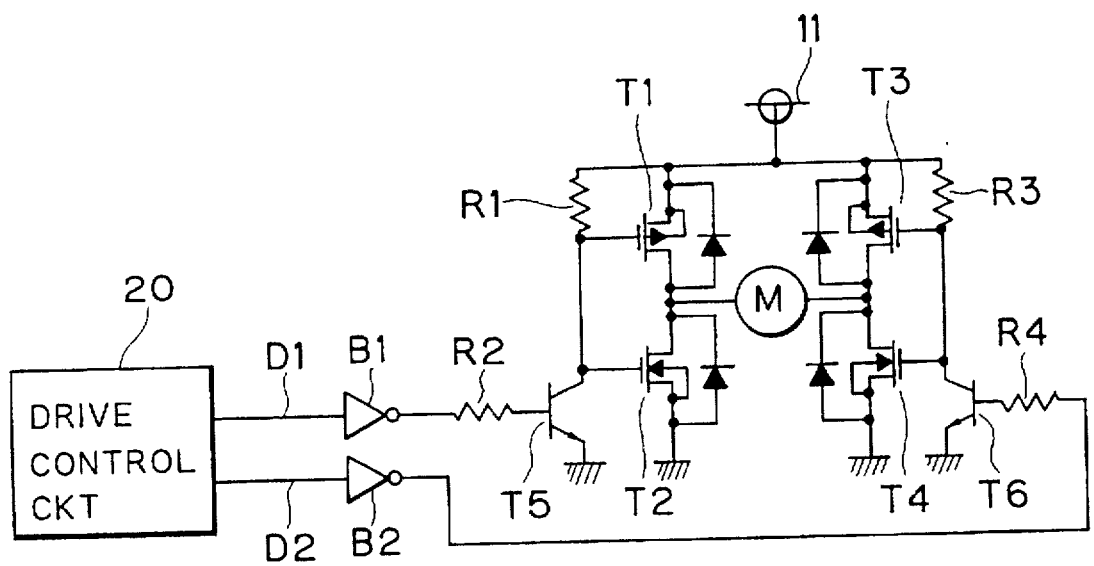
FIG. 1A shows a circuit diagram of a motor drive unit in accordance with an embodiment of the present invention.
FIG. 1B shows states of output signals D1 and D2 of a motor control circuit 20 of FIG. 1A.
Figures 2A, 2B:
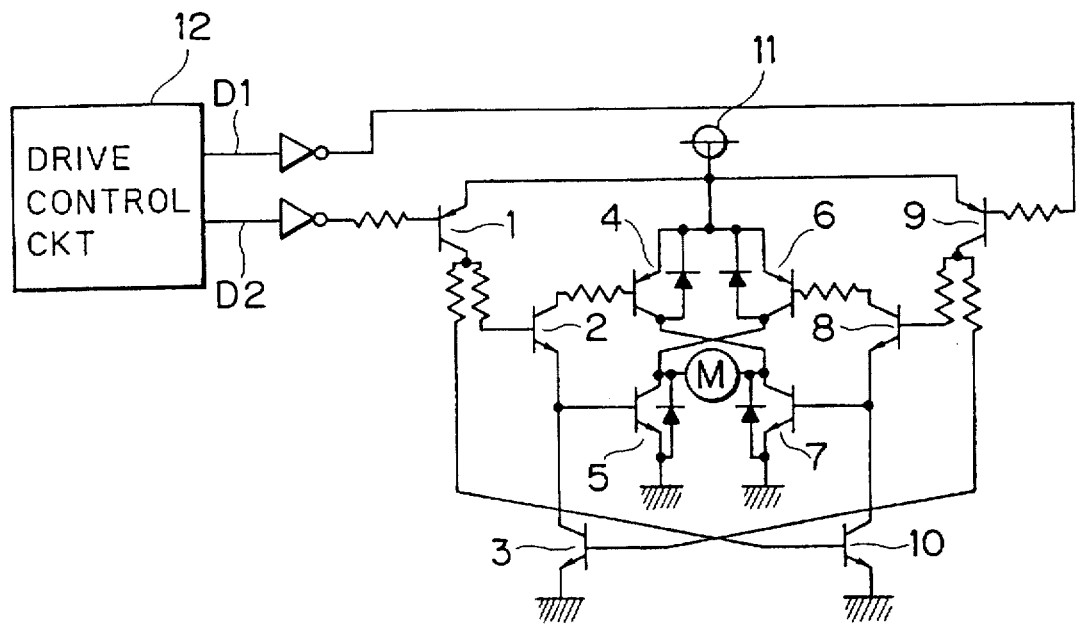
FIG. 2A shows a circuit diagram of a prior art motor drive unit.
FIG. 2B shows state of output signals D1 and D2 of a drive control circuit 12 of FIG. 2A.
Figure 3:
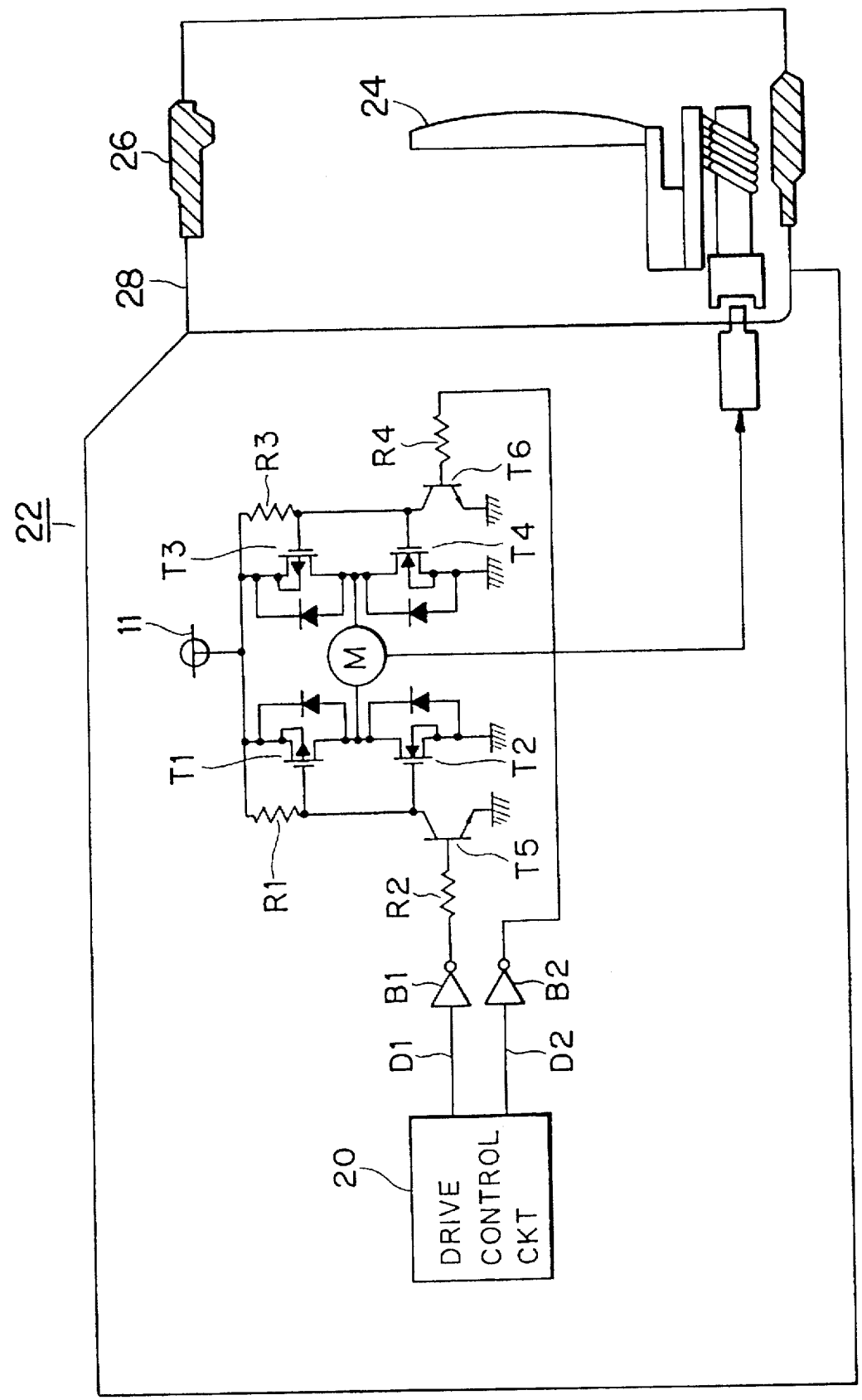
FIG. 3 shows a camera 22 having a motor drive unit in accordance with an embodiment of the present invention.

FIGS. 1A, 1B and 3 show an embodiment of the present invention and they show a motor drive unit for controlling in-focus drive of a photographing lens 24 in an auto-focusing device of a camera 22. As shown in FIG. 3, a motor drive unit is located in the camera 22 and drives the photographing lens 24 according to signals received from a drive control circuit 20. A focusing ring 26 of a lens barrel is also connected to the photographing lens 24 such that operation of the focusing ring 26 moves the photographing lens 24 when the camera 22 is not in the auto-focus mode. In accordance with an embodiment of the present invention, a motor which drives the photographing lens 24 is kept in a short-brake state during non-drive of the photographing lens 24 such that a force acts on the photographing lens 24 and the lens 24 is not moves if the focusing ring 26 is inadvertently touched. FIG. 1A shows a circuit diagram of the motor drive unit and FIG. 1B shows states of output signals D1 and D2 of a drive control circuit 20 of FIG. 1A.

In FIG. 1A, a motor M is connected to a junction of MOS transistors T1 and T2, a power supply line is connected to the other end of the MOS transistor T1, and a ground line is connected to the other end of the MOS transistor T2. Similarly, the motor M, a power supply line and a ground line are connected to MOS transistors T3 and T4.

Gates of the MOS transistors T1 and T2 are connected to a collector of a transistor T5, and pulled up to a power supply 11 through a resistor R1. Similarly, gates of the MOS transistors T3 and T4 are connected to a collector of the transistor T6 and pulled up to the power supply 11 through a resistor R3.

The transistors T5 and T6 are connected to inverters B1 and B2 through resistors R2 and R4, respectively, and the inverters B1 and B2 are connected to the drive control circuit 20.

In the motor drive unit of the present embodiment, when the motor M is to be driven forward, the output signals D1 and D2 of the drive control circuit 20 are rendered to H-level and L-level, respectively, so that the transistor T5 is turned off and the transistor T6 is turned on. Accordingly, the gate voltage of the MOS transistor T2 reaches substantially the power supply voltage and the gate-source is sufficiently biased. As a result, the transistor T2 is turned on. Since the gate-source voltage of the MOS transistor T1 is substantially zero, T1 is turned off. On the other hand, since the transistor T6 is conductive, the gate-source voltage of the MOS transistor T4 is substantially zero and T4 is turned off. Since the gate-source of the MOS transistor T3 is sufficiently biased, T3 is turned on. As a result, a current flows from the MOS transistor T3 to the motor M and the MOS transistor T2 so that the motor M is driven forward.

On the other hand, when the motor M is to be driven backward, the output signals D1 and D2 of the drive control circuit 20 are rendered to the L-level and the H-level, respectively. As a result, the MOS transistors, T1 and T4 are turned on and the MOS transistors T2 and T3 are turned off so that the motor M is driven backward.

When the motor M is not to be driven, the output signals D1 and D2 of the drive control circuit 20 are rendered to the H-level. As a result, the MOS transistors T1 and T3 are turned off and the MOS transistors T2 and T4 are turned on so that the motor M is kept in the short-brake state. Since the MOS transistors are used, they can be turned on and off by the gate voltage only. Accordingly, the power consumption is very small even if the short-brake state is continuously kept.

In the present embodiment, the motor drive unit used for the auto-focusing control device has been explained. However, the present invention is not limited thereto but it is applicable to any unit in which the driven part is prevented from inadvertent external drive after the driven part has been motor-driven. For example, an irradiation angle control device of an electronic flash device to be mounted on a camera drives a diffusion plate by a motor in accordance with a zooming ratio, and the present invention is applicable to such a device.

When the present invention is applied to the auto-focusing control device of the camera or the irradiation angle control device of the flash device of the camera, it is preferable that the motor brake state is kept when a main power supply of the camera or a power supply of the flash device is turned on and the motor is not driven.

In accordance with the present invention, since the short-brake state is continuously kept when the motor is not driven, the driven part is not easily driven even if a force is applied to the driven part. Further, since the drive transistors are MOS transistors, the power consumption is very small even if the short-brake state is kept.

What is claimed is:

1. In a device for use in a camera system and having a DC motor-driven component susceptible to external forces tending to cause deviation of said component from positions to which it has been driven, a motor drive unit comprising:

a bridge circuit including serially connected first and second MOS transistors and serially connected third and fourth MOS transistors, with said motor being connected between a junction of said first and second MOS transistors and a junction of said third and fourth MOS transistors;

a photographing lens barrel provided on the camera;

a lens for focusing, provided in said photographing lens barrel, which is moved by the rotation of said DC motor;

a focusing ring, provided on said photographing lens barrel, which is adapted to be externally operated to be moved so as to move said lens for focusing;

a drive control command circuit which outputs rotation control command and stop control command signals for rotating said DC motor and stopping said DC motor, respectively; and a power control circuit electrically connecting said bridge circuit and said drive control command circuit, said power control circuit being responsive to receipt of a rotation control command signal from said drive control command circuit to turn on a first pair of said first to fourth MOS transistors which connects said DC motor across a supply voltage to rotate said DC motor, and being responsive to receipt of a stop control command signal from said drive control command circuit to turn on a second pair of said first to fourth MOS transistors which connects said DC motor in a short-bake state; and wherein when power is being supplied to said drive control command circuit and said DC motor is stopped, said drive control command circuit maintains a stop control command signal until said DC motor is to be next driven;

and wherein when said DC motor is controlled by said power control circuit to be in a short-brake state, a load due to the short-brake is applied against the movement of said focusing lens.

2. The invention of claim 1, wherein said component includes a lens.

3. The invention of claim 1, wherein said component includes a diffusion plate of a flash device.

4. A camera provided with an auto-focusing device comprising:

a bridge circuit including serially connected first and second MOS transistors, serially connected third and fourth MOS transistors, and a DC motor connected between a junction of said first and second MOS transistors and a junction of said third and fourth MOS transistors:

a photographing lens barrel provided on the camera;

a lens for focusing, provided in said photographing lens barrel, which is moved by the rotation of said DC motor;

a focusing ring, provided on said photographing lens barrel, which is adapted to be externally operated to be moved so as to move said lens for focusing;

a drive control command circuit which outputs control command signals regarding driving of said DC motor, said drive control command circuit outputting at least a first control command signal for rotating said DC motor and a second control command signal for stopping said DC motor; and a power control circuit electrically connecting said bridge circuit and said drive control command circuit;

said power control circuit outputting, on receipt of said first control command signal from said drive control command circuit, a first control signal for turning on a first pair of said first to fourth MOS transistors which connects said DC motor across a supply voltage to rotate said DC motor, and outputting, upon receipt of said second control command signal from said drive control command circuit, a second control signal for turning on a second pair of said MOS transistors which connects said DC motor in a short-brake state;

and wherein when power is being supplied to the motor drive unit and said DC motor is stopped, said second control signal is maintained until said motor is to be next driven;

and wherein when said DC motor is controlled by said power control circuit to be in a short-brake state, a load due to the short-brake is applied against the movement of said focusing lens.

5. A camera provided with an auto-focusing device comprising;

a bridge circuit including serially connected first and second MOS transistors, serially connected third and fourth MOS transistors, and a DC motor connected between a junction of said first and second MOS transistors and a junction of said third and fourth MOS transistors;

a photographing lens barrel provided on the camera;

a lens for focusing, provided in said photographing lens barrel, which is moved by the rotation of said DC motor;

a focusing ring, provided on said photographing lens barrel, which is adapted to be externally operated to be moved so as to move said lens for focusing;

a drive control command circuit which outputs control command signals regarding driving of said DC motor, said drive control command circuit outputting at least a first control command signal for rotating said DC motor and a second control command signal for stopping said DC motor; and a power control circuit electrically connecting said bridge circuit and said drive control circuit;

said power control circuit being responsive to said first control command signal to turn on a first pair of said first to fourth MOS transistors which connects said DC motor across a supply voltage to rotate said DC motor, and being responsive to said second control command signal to turn on a second pair of said first to fourth MOS transistors which connects said DC motor in a short-brake state, said drive control command circuit maintaining said second control command signal as long as said DC motor is not to be driven and power is being supplied to said drive control command circuit;

and wherein when said DC motor is controlled by said power control circuit to be in a short-brake state, a load due to the short-brake is applied against the movement of said focusing lens.

6. In a device for use in a camera system and having a DC motor-driven component susceptible to external forces tending to cause deviation of said component from positions to which it has been driven, a motor drive unit comprising:

a bridge circuit including serially connected first and second MOS transistors and serially connected third and fourth MOS transistors, with said motor being connected between a junction of said first and second MOS transistors and a junction of said third and fourth MOS transistors a photographing lens barrel provided on the camera;

a lens, provided in said photographing lens barrel, which is moved by the rotation of said DC motor;

a drive control command circuit which outputs rotation control command and stop control command signals for rotating said DC motor and stopping said DC motor, respectively; and a power control circuit electrically connecting said bridge circuit and said drive control command circuit, said power control circuit being responsive to receipt of a rotation control command signal from said drive control command circuit to turn on a first pair of said first to fourth MOS transistors which connects said DC motor across a supply voltage to rotate said DC motor, and being responsive to receipt of a stop control command signal from said drive control command circuit to turn on a second pair of said first to fourth MOS transistors which connects said DC motor in a short-bake state; and wherein when power is being supplied to said drive control command circuit and said DC motor is stopped, said drive control command circuit maintains a stop control command signal until said DC motor is to be next driven;

and wherein when said DC motor is controlled by said power control circuit to be in a short-brake state, a load due to the short-brake is applied against the movement of said lens.

7. The invention of claim 6, wherein said component includes a lens.

8. The invention of claim 6, wherein said component includes a diffusion plate of a flash device.

9. A camera, comprising:

a bridge circuit including serially connected first and second MOS transistors, serially connected third and fourth MOS transistors, and a DC motor connected between a junction of said first and second MOS transistors and a junction of said third and fourth MOS transistors a photographing lens barrel provided on the camera;

a lens, provided in said photographing lens barrel, which is moved by the rotation of said DC motor;

a drive control command circuit which outputs control command signals regarding driving of said DC motor, said drive control command circuit outputting at least a first control command signal for rotating said DC motor and a second control command signal for stopping said DC motor; and a power control circuit electrically connecting said bridge circuit and said drive control command circuit;

said power control circuit outputting, on receipt of said first control command signal from said drive control command circuit, a first control signal for turning on a first pair of said first to fourth MOS transistors which connects said DC motor across a supply voltage to rotate said DC motor, and outputting, upon receipt of said second control command signal from said drive control command circuit, a second control signal for turning on a second pair of said MOS transistors which connects said DC motor in a short-brake state;

and wherein when power is being supplied to the motor drive unit and said DC motor is stopped, said second control signal is maintained until said motor is to be next driven;

and wherein when said DC motor is controlled by said power control circuit to be in a short-brake state, a load due to the short-brake is applied against the movement of said lens.

10. A camera, comprising;

a bridge circuit including serially connected first and second MOS transistors, serially connected third and fourth MOS transistors, and a DC motor connected between a junction of said first and second MOS transistors and a junction of said third and fourth MOS transistors;

a photographing lens barrel provided on the camera;

a lens, provided in said photographing lens barrel, which is moved by the rotation of said DC motor;

a drive control command circuit which outputs control command signals regarding driving of said DC motor, said drive control command circuit outputting at least a first control command signal for rotating said DC motor and a second control command signal for stopping said DC motor; and a power control circuit electrically connecting said bridge circuit and said drive control circuit;

said power control circuit being responsive to said first control command signal to turn on a first pair of said first to fourth MOS transistors which connects said DC motor across a supply voltage to rotate said DC motor, and being responsive to said second control command signal to turn on a second pair of said first to fourth MOS transistors which connects said DC motor in a short-brake state, said drive control command circuit maintaining said second control command signal as long as said DC motor is not to be driven and power is being supplied to said drive control command circuit;

and wherein when said DC motor is controlled by said power control circuit to be in a short-brake state, a load due to the short-brake is applied against the movement of said lens.

* * * * *